May 12, 1964　　　B. L. BRUCKEN ETAL　　　3,133,286
DRY CLEANING APPLIANCE

Filed April 26, 1961　　　　　　　　　3 Sheets-Sheet 1

INVENTORS
Byron L. Brucken
BY Victor A. Williamitis
Frederick M. Ritchie
Their Attorney May 12, 1964  B. L. BRUCKEN ETAL  3,133,286
DRY CLEANING APPLIANCE
Filed April 26, 1961  3 Sheets-Sheet 2

INVENTORS
Byron L. Brucken
BY Victor A. Williamitis
Their Attorney

May 12, 1964  B. L. BRUCKEN ETAL  3,133,286
DRY CLEANING APPLIANCE
Filed April 26, 1961  3 Sheets-Sheet 3

INVENTORS
Byron L. Brucken
Victor A. Williamitis
BY
Frederick M. Ritchie
Their Attorney

United States Patent Office 3,133,286
Patented May 12, 1964

3,133,286
DRY CLEANING APPLIANCE
Byron L. Brucken and Victor A. Williamitis, Dayton, Ohio, assignors to General Motors Corporation, Detroit, Mich., a corporation of Delaware
Filed Apr. 26, 1961, Ser. No. 105,670
20 Claims. (Cl. 68—18)

This invention relates to a domestic appliance and more particularly to an improved coin operated dry cleaning machine.

In dry cleaning apparatus, it is desirable to maintain the solvent in a suitably filtered or uncontaminated condition in order that the clothes are cleaned efficiently. Where a domestic appliance is adapted for use interchangeably as a clothes washer or a dry cleaning apparatus, it is desirable to locate the solvent filter for the dry cleaning apparatus in a readily accessible position.

Accordingly, it is an object of this invention to adapt a clothes washing machine for dry cleaning.

Another object of this invention is the provision of a solvent filter in the console of a washing apparatus.

Another object of this invention is the provision of a readily accessible and disposable filter insert for the console of a dry cleaning apparatus.

It is a further object of this invention to provide a dry cleaning apparatus with a filter above the spin tub such that a continuous overflow of solvent may be effected throughout an agitate period.

A more specific object of this invention is the provision of an elongated accordion-pleated removable support element for a filter sheet in the console of a washing apparatus.

Further objects and advantages of the present invention will be apparent from the following description, reference being had to the accompanying drawings wherein preferred embodiments of the present invention are clearly shown.

Figures 1, 5:
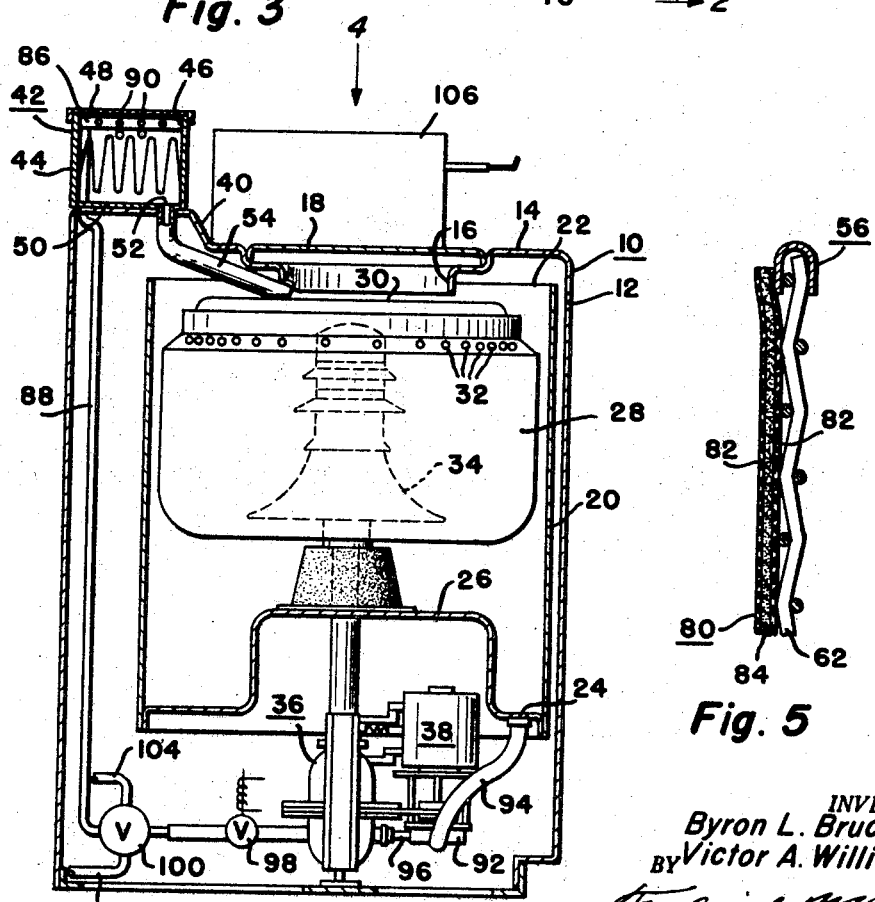
FIGURE 1 is a schematic side sectional view, partly in elevation, of a dry cleaning apparatus suitable for use with this invention.
FIGURE 5 is an enlarged sectional view of the disposable filter and the removable filter support.

In accordance with this invention and with reference to FIGURE 1, a washing apparatus 10 is illustrated as adapted for use as a dry cleaner. The washer 10 is comprised of an outer casing 12 having a top wall 14 and an access opening 16 which is closed by a hinged access lid 18. Within the outer casing 12 is disposed a cylindrical solvent container 20 which is imperforate except for a top opening 22 and a bottom outlet 24 at the lowest point thereof. A central bulkhead 26 serves to support a spin tub 28 for rotation within the solvent container. The spin tub 28 has a top access opening 30 in axial alignment with the cabinet opening 16 and a plurality of circumferentially arranged outflow ports 32. Within the spin tub 28, an agitatior 34 is located. Beneath the bulkhead 26 and suspended thereby is an agitating and spinning mechanism shown generally at 36 which is adapted to selectively rotate the spin tub 28 when the mechanism motor 38 is rotating in one direction and to vertically reciprocate the agitator 34 when the motor 38 is reversed. For further details pertaining to the agitator and spinning mechanism 36, reference may be had to the Sisson Patent 2,758,685, issued August 14, 1956.

Figure 4:
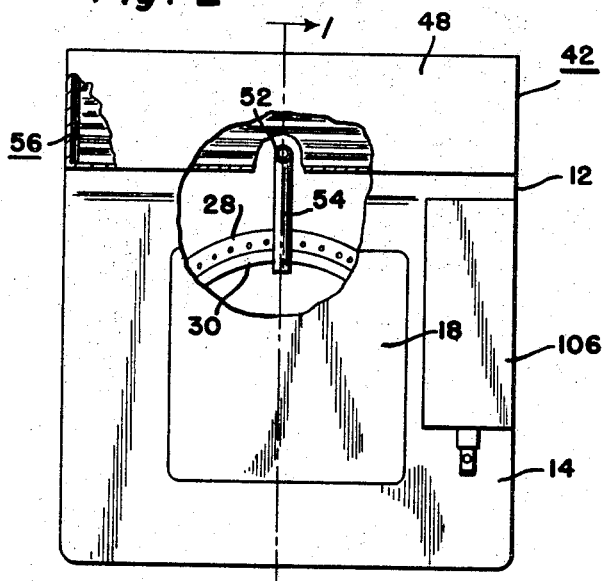
FIGURE 4 is a top elevational view of the dry cleaner of this invention with parts broken away.

Turning now to FIGURES 1 and 4, the top wall 14 of the casing 12 is shown with a raised rear console support portion 40 on which is supported a console filter container or box shown generally as 42. The console filter is comprised of a box-like filter container 44 having a top opening 46 closed by a removable cover 48. The bottom wall 50 of the filter container is imperforate except for an outlet opening 52 which is connected by a supply conduit 54 in overlying relationship with the top opening 30 of the spin tub.

When the filter container cover 48 is removed, a filter container is adapted to receive a box-like filter support frame 56 comprising a pair of end plates 58 and 60 between which extends a serpentine or accordion-pleated reticulated support form or screen 62. The screen rests at its opposite ends on complementary shoulders 63 fastened as by welding to each end plate. Each end plate may also include overflow by-pass ports such as 64 and 66 respectively. This provides for by-passing solvent around the filter in case the supply to the filter is greater than the filter capacity as will be understood more fully hereinafter. The filter frame 56 is generally rectangular in form and of smaller dimension than the filter container 44 such that the filter frame is spaced from the container about its periphery to form a clearance 70 between the filter frame and the container.

In considering a self-contained dry cleaning and solvent purifying system such as set forth for the apparatus 10, it appears that sorption and filtration can be an effective and economical manner of maintaining a solvent in an uncontaminated condition. The materials to consider in dry cleaning for use in sorption and filtration of such solvent contaminants as lint, dirt solids, organic acid and even some of the cleaned off oil and grease are activated carbon, fuller's earth, bauxite and similar sorbing clays, treated or untreated, diatomaceous earth, magnesium oxide, silica gel, alumina and molecular sieve. Actually a mixture of these would serve best. Activated charcoal should be included as the most potent scavenger for any dyes removed from clothing. Magnesium oxide would be included as a preferred agent for sorbing any free fatty acid. The acid clays such as fuller's earth would be economic sorbers of some of the general oil and grease. The diatomaceous earth would assist in building a freeflowing filter. A combination or composite of the above elements (FIGURE 5) would be formed into a suitable filter sheet or ribbon 80 having a porous paper backing 82 for retaining in sandwiched relation the filter composite 84. Thus, a sheet of the filter 80 as wide as the support 56 can be pressed downwardly into coextensive engagement with the support screen 62 on the filter frame. The sheet of filter paper 80 may be replaced and disposed of as often as necessary to provide for effective filtration of the recirculating solvent.

Figure 3:
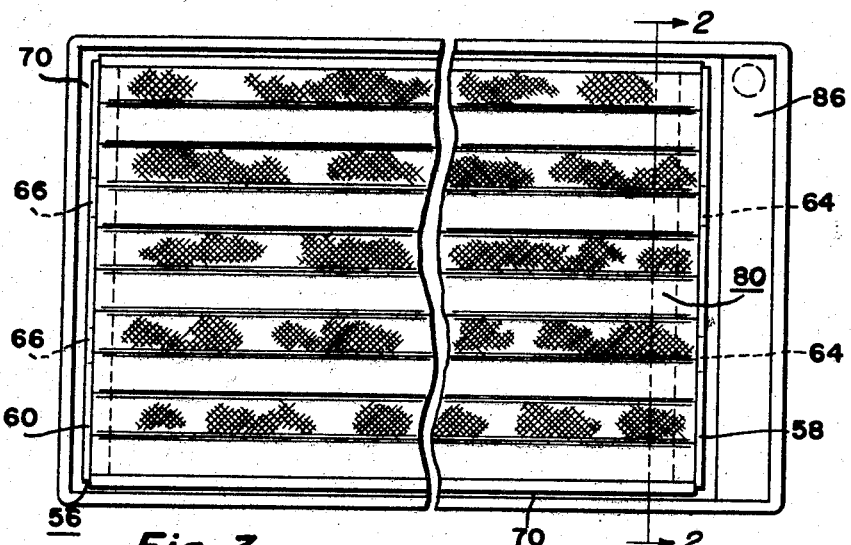
FIGURE 3 is a fragmentary top elevational view of this invention with the filter container cover removed.
Figure 2:
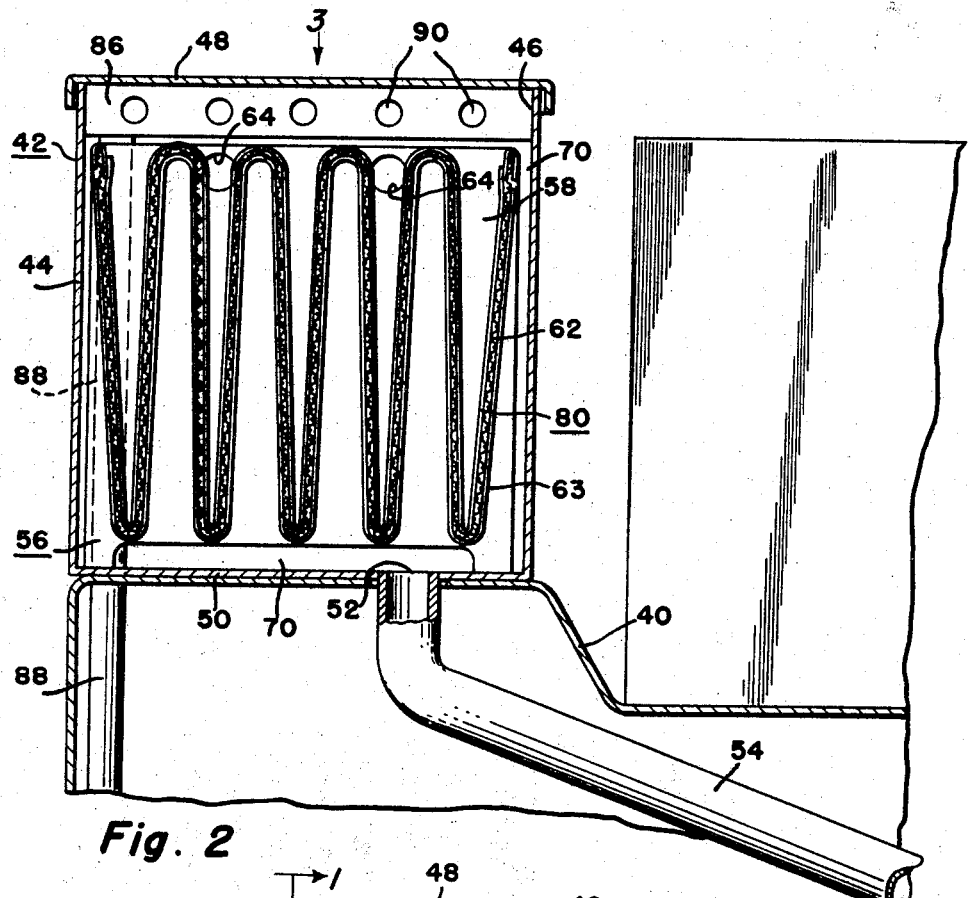
FIGURE 2 is a fragmentary sectional view, partly in elevation, taken along line 2—2 in FIGURE 3 to show the removable filter support arrangement of this invention.

Completing the solvent circulating system and with reference to FIGURES 1, 2 and 3, a solvent distribution header 86 is illustrated at one end of the filter container 42. The filter header is supplied by way of a supply conduit 88 and includes a plurality of solvent spray ports 90 above the top of the filter frame 56. A pump 92 is connected by a conduit 94 to the solvent container 24 and includes a pump outlet 96 which is connected to the header supply conduit 88 through a solenoid operated valve 98 (for retaining the solvent in the solvent storage container 20 when the equipment is not in operation) and a three-way valve 100 (for selectively directing the solvent to a waste drain 102, the filter chamber 42 or a solvent make-up line 104).

In operation, clothes are placed through the access opening 16 into the spin tub 28 and the cleaning cycle initiated through any conventional coin operated timing mechanism such as 106. The pump 92 will be operated by the motor 38 to circulate the solvent from its storage in the container 20 to the spin tub 28 as follows. The valve 98 will be in an open condition and the solvent will be pumped through the three-way valve 100 to the header supply conduit 88. The solvent will enter the filter container 44 at the solvent distribution header 86 and will be distributed substantially equally about the top of the accordion pleats or folds of the filter 80. The solvent will flow by gravity through the filter element 80, returning to the filter container or box 44 along the bottom wall thereof from which point it will drain by gravity through the conduit 54 to the spin tub. Should the pump 92 supply solvent to the filter container 44 faster than it can flow through the filter element 80, the level of the solvent will rise until it reaches the by-pass ports 64, 66. Then the solvent will flow around the filter 80 by overflowing the filter support 56, thereby going directly to the spin tub 28 without filtration. Periodically, it will be necessary to remove the cover 48 of the filter container and strip off and dispose of the contaminated filter paper. A new strip of filter paper will be pressed into engagement with the folds of the support screen to place the equipment in condition for additional dry cleaning cycles.

Figure 7:
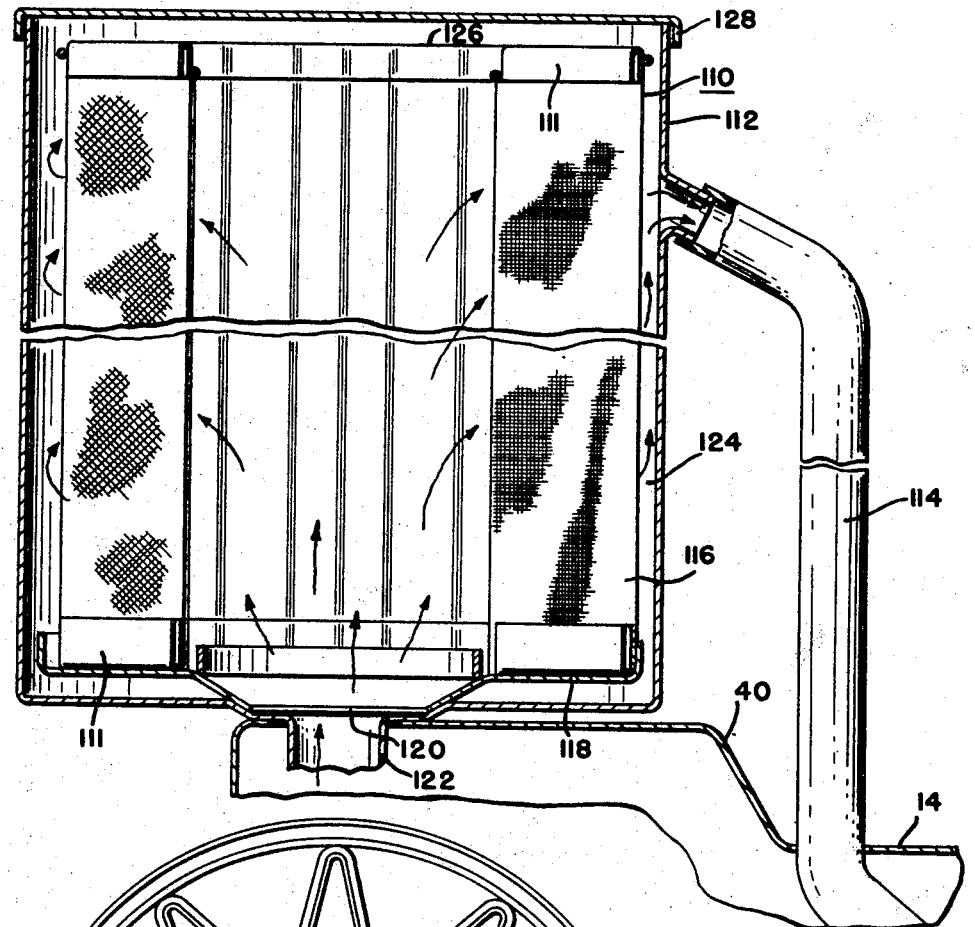
FIGURE 7 is a fragmentary sectional view of the filter taken along line 7—7 in FIGURE 6 and installed on a dry cleaning apparatus.
Figure 6:
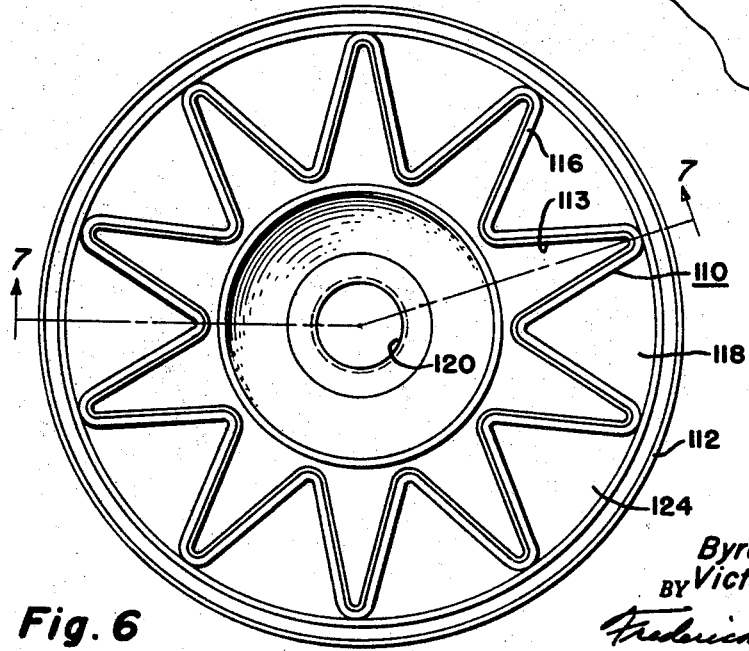
FIGURE 6 is a top elevational view of another embodiment of this invention with its cover removed.

With reference to FIGURES 6 and 7, a round star-shaped cartridge or canister 110 is illustrated which inserts within a cylindrical filter container 112 positioned on the washer console. As with the preferred version, the filtered fluid returns by gravity to the spin tub by way of a conduit 114. More particularly, the filter cartridge 110 is formed by a folded or pleated support screen 116 held together at the top and bottom by a reinforcing strip 111. Filter paper 113 such as used on the preferred version is adapted to be pressed into engagement with the radially inner side of the screen. The cartridge is carried on a generally imperforate circular bottom support plate 118 having an inlet port 120. Solvent is pumped through a conduit 122 into the center of the filter cartridge 110 and flows as shown by the arrows radially outwardly through the filter element 113 and the screen 116 into the clearance space 124 between the filter cartridge and the cylindrical container 112. As with the preferred version, a by-pass arrangement is effected since the top 126 of the filter cartridge 110 is open to permit a solvent oversupply to overflow the top of the cartridge in passing directly to the tub. Here also the cartridge 110 is removable so that the filter 113 may be stripped from the support screen 116 and replaced with a fresh filter.

It should now be seen that an improved dry cleaning apparatus has been devised wherein a pre-built filter element is self-contained and readily accessible for easy replacement.

While the embodiments of the present invention as herein disclosed constitute preferred forms, it is to be understood that other forms might be adopted.

What is claimed is as follows:

1. In combination, a casing means defining a dry cleaning apparatus having a console support portion, a solvent container in said casing having a bottom bulkhead, said bottom bulkhead having a drain opening, a spin tub rotatably mounted in said solvent container and having a circumferentially arranged set of outflow ports along an upper portion thereof and a top opening, means for selectively spinning said spin tub, a filter box on said console support portion having an outlet along a bottom wall thereof above said spin tub and connected with the top opening of said spin tub, a solvent header in said box having an inlet conduit and a series of spray ports along a top portion of said filter box, a removable filter frame in solvent spray receiving relationship to said header and configured to fit into said box in spaced relation to the walls of said box to form a by-pass passage and having a perforate pleated filter support portion, a replaceable filter sheet in juxtaposition to said filter support portion, and pump means having an inlet connected to said solvent container drain opening and an outlet connected to said header inlet conduit for circulating solvent from said solvent container through said filter sheet and said by-pass passage to said spin tub.

2. The combination of claim 1 wherein said filter sheet is comprised of a first porous backing, a second porous backing and a mixture therebetween taken from the group consisting of carbon, fuller's earth, bauxite, diatomaceous earth, magnesium oxide, silica gel, alumina and molecular sieve.

3. In combination, a casing means defining a dry cleaning apparatus, a dry cleaning solvent container in said casing having a top opening and a bottom bulkhead, said bottom bulkhead having a drain opening, a spin tub rotatably mounted in said solvent container and having an access opening, means in said spin tub for agitating, means for selectively spinning said spin tub, a filter housing on said casing means having an outlet connected with the access opening of said spin tub and an inlet conduit to said housing, a removable filter frame in said filter housing configured to fit in spaced relation to a side of said housing to form a by-pass passage to said outlet and having a perforate multiple fold filter support portion, a replaceable and disposable, unitary filter sheet in juxtaposition to said filter support portion between said inlet conduit and said outlet, said filter sheet including means for filtering and sorbing contaminants from said solvent, and pump means having an inlet connected to said solvent container drain opening and an outlet connected to said inlet conduit for circulating solvent from said solvent container through said filter housing to said spin tub.

4. The combination of claim 3 wherein said filter housing is cylindrical and said frame is a star-shaped member in flow intercepting relationship to said circulating solvent.

5. The combination of claim 3 wherein said filter housing is an elongated box and said frame is formed of elongated screen folds in flow intercepting relationship to said circulating solvent.

6. A clothes cleaner comprising means forming a wash tub having an access opening, means for agitating in said tub, means forming a storage container around said tub and adapted to contain a solvent, unitary means including means for filtering and means for sorbing contaminants from said solvent and having a receiving inlet on one side thereof and an outlet on the other side thereof in gravity flow relationship to said tub, said means for filtering and said means for sorbing being in permanently fixed relationship to each other, means for pumping said solvent from said storage container to said receiving inlet thereby to effect gravity flow of filtered and sorbed solvent to said tub, and means for selectively spinning said tub to return said solvent to said storage container.

7. The clothes dry cleaner of claim 6 wherein said means for filtering is a disposable sheet of filter paper and said means for sorbing is activated charcoal.

8. The clothes dry cleaner of claim 6 wherein said means for filtering and said means for sorbing is a disposable sheet of filter paper and filter composite, and said unitary means includes a multiple fold perforate element for supporting said sheet.

9. A self-contained dry cleaner for clothes comprising means forming a vertical wash tub adapted to receive a dry cleaning solvent, means for agitating in said tub, means forming a storage container separate from said tub and adapted to contain said solvent, unitary means including means for filtering and means for sorbing contaminants from said solvent and having an inlet side connected to said container and an outlet side connected to said tub, said means for filtering and said means for sorbing being in permanently fixed relationship to each other, means for circulating said solvent from said storage container through said unitary means to said tub, and means for selectively spinning said tub to return said solvent to said storage container.

10. The dry cleaner of claim 9 wherein said means for filtering and means for sorbing is a replaceable and disposable element.

11. The dry cleaner of claim 10 including a cylindrical chamber above said tub, and wherein said unitary means includes a multiple fold star-shaped perforate canister for supporting said replaceable and disposable element.

12. The dry cleaner of claim 9 including a chamber above said tub enclosing said unitary means, and wherein said unitary means includes a multiple fold perforate element for supporting said means for filtering and means for sorbing.

13. A clothes dry cleaning system comprising means forming a chamber for retaining a dry cleaning solvent during a cleaning period, means adapted to contain a dry cleaning solvent, means for directing said solvent from said containing means to said chamber, and unitary means including means for filtering and means for sorbing contaminants from said solvent, said means for filtering and means for sorbing being a replaceable and disposable element, and said means for filtering and said means for sorbing being in permanently fixed relationship to each other.

14. A clothes dry cleaning system comprising means forming a chamber for retaining a dry cleaning solvent during a cleaning period, means for directing said solvent to said chamber, and permanently unitary means including means for filtering and means for sorbing contaminants from said solvent before it enters said chamber, said means for filtering and said means for sorbing being a replaceable and disposable element, and said means for filtering being in permanently fixed relationship to said means for sorbing.

15. The clothes dry cleaning system of claim 14 wherein said means for filtering is a folded paper component of said replaceable and disposable element.

16. A self-service dry cleaner for clothes comprising means forming a cleaning tub adapted to receive a dry cleaning solvent, means for agitating in said tub, means forming a storage container separate from said tub and adapted to contain said solvent, unitary means including means for filtering and means for sorbing contaminants from said solvent and having an inlet side connected to said container and an outlet side connected to said tub, said means for filtering and said means for sorbing being in permanently fixed relationship to each other, means for circulating said solvent from said storage container through said means for filtering and said means for sorbing to said tub, and means for returning said solvent to said storage container.

17. A self-service dry cleaner for clothes comprising means forming a cleaning tub adapted to receive a dry cleaning solvent, means for agitating in said tub, means forming a storage container separate from said tub and adapted to contain said solvent, permanently unitary means including means for filtering and means for sorbing contaminants from said solvent and having an inlet side connected to said container and an outlet side connected to said tub, said means for filtering and said means for sorbing being in permanently fixed relationship to each other, means for circulating said solvent from said storage container through said means for filtering and said means for sorbing to said tub, and means for returning said solvent to said storage container, said unitary means including said means for filtering and said means for sorbing being replaceable and disposable.

18. In combination, a casing means defining a clothes dry cleaning apparatus, a dry cleaning solvent container in said casing having a top opening and a bottom bulkhead, said bottom bulkhead having a drain opening, a spin tub rotatably mounted in said solvent container and having an access opening, means in said spin tub for agitating, means for selectively spinning said spin tub, a filter housing in fixed relation to said casing means having an outlet connected with the access opening of said spin tub and an inlet conduit, a removable filter frame in said filter housing configured to fit in spaced relation to a side of said housing to form a passage between said inlet conduit and said outlet and having a perforate filter support portion, a replaceable and disposable, unitary multiple fold filter sheet in juxtaposition to said filter support portion between said inlet conduit and said outlet, said filter sheet including means for filtering and means for sorbing contaminants from said solvent, said means for filtering and said means for sorbing being in permanently fixed relationship to each other, and pump means having an inlet connected to said solvent container drain opening and an outlet connected to said inlet conduit for circulating solvent from said solvent container through said filter housing to said spin tub.

19. A self-service dry cleaner for clothes comprising means forming a cleaning tub adapted to receive a dry cleaning solvent, means for agitating in said tub, means forming a storage container separate from said tub and adapted to contain said solvent, unitary means for filtering and sorbing contaminants from said solvent and having an inlet side connected to said container and an outlet side connected to said tub, said unitary means including a plurality of filtering stages in permanently fixed relationship to each other, means for circulating said solvent from said storage container through said unitary means to said tub, and means for returning said solvent to said storage container.

20. For use solely with a dry cleaning system for clothes or the like having means forming a chamber for retaining a dry cleaning solvent during a cleaning period, a container, and means for directing said solvent to said chamber through said container, a permanently unitary means adapted solely for installation in said container in intercepting flow relationship to solvent directed through said container and comprising means for filtering and means for sorbing contaminants from said solvent before it enters said chamber, said means for filtering and said means for sorbing being a replaceable and disposable element, and said means for filtering being in permanently fixed relationship to said means for sorbing.

References Cited in the file of this patent
UNITED STATES PATENTS

| | | |
|---|---|---|
| 1,385,724 | Smith | July 26, 1921 |
| 1,737,313 | Kamrath | Nov. 26, 1929 |
| 1,788,085 | Dorner | Jan. 6, 1931 |
| 2,279,423 | Vokes | Apr. 14, 1942 |
| 2,303,541 | Gluckman | Dec. 1, 1942 |
| 2,329,356 | Moore | Sept. 14, 1943 |
| 2,413,954 | Conterman | Jan. 7, 1947 |
| 2,481,979 | Colley | Sept. 13, 1949 |
| 2,675,127 | Layte | Apr. 13, 1954 |
| 2,907,407 | Engle | Oct. 6, 1959 |
| 2,946,409 | Jennings | July 26, 1960 |
| 2,959,286 | Hickman | Nov. 8, 1960 |